United States Patent
Desclos et al.

(10) Patent No.: US 9,883,322 B2
(45) Date of Patent: Jan. 30, 2018

(54) HETEROGENEOUS NETWORK OPTIMIZATION AND ORGANIZATION UTILIZING MODAL ANTENNA TECHNIQUES AND MASTER-SLAVE SCHEMES

(71) Applicant: Ethertronics, Inc., San Diego, CA (US)

(72) Inventors: Laurent Desclos, San Diego, CA (US); Olivier Pajona, Antibes (FR)

(73) Assignee: ETHERTRONICS, INC., San Diego, CA (US)

( * ) Notice: Subject to any disclaimer, the term of this patent is extended or adjusted under 35 U.S.C. 154(b) by 216 days.

(21) Appl. No.: 14/845,183

(22) Filed: Sep. 3, 2015

(65) Prior Publication Data

US 2016/0192113 A1    Jun. 30, 2016

Related U.S. Application Data

(63) Continuation-in-part of application No. 14/821,655, filed on Aug. 7, 2015.

(60) Provisional application No. 62/045,509, filed on Sep. 3, 2014, provisional application No. 62/034,554, filed on Aug. 7, 2014.

(51) Int. Cl.
| | |
|---|---|
| *H04W 4/00* | (2009.01) |
| *H04W 72/08* | (2009.01) |
| *H04W 16/28* | (2009.01) |
| *H04W 48/18* | (2009.01) |
| *H04W 84/12* | (2009.01) |
| *H04W 84/20* | (2009.01) |

(52) U.S. Cl.
CPC .......... *H04W 4/006* (2013.01); *H04W 16/28* (2013.01); *H04W 48/18* (2013.01); *H04W 84/12* (2013.01); *H04W 84/20* (2013.01)

(58) Field of Classification Search
CPC ...... H04W 16/28; H04W 48/18; H04W 4/006
See application file for complete search history.

(56) References Cited

U.S. PATENT DOCUMENTS

| | | | |
|---|---|---|---|
| 6,134,234 A | 10/2000 | Kapanen | |
| 7,787,408 B2 | 8/2010 | Proctor, Jr. et al. | |
| 8,359,051 B2 | 1/2013 | Marsden et al. | |
| 9,015,393 B2 | 4/2015 | Korpinen et al. | |
| 9,320,080 B2 | 4/2016 | Mardsen et al. | |
| 2002/0126013 A1* | 9/2002 | Bridgelall | G01S 5/0009 340/572.1 |
| 2005/0181725 A1* | 8/2005 | Dabak | H04W 92/02 455/41.2 |
| 2011/0222523 A1* | 9/2011 | Fu | H04W 36/22 370/338 |

(Continued)

*Primary Examiner* — Yemane Mesfin
*Assistant Examiner* — Derrick V Rose
(74) *Attorney, Agent, or Firm* — Coastal Patent Law Group, P.C.

(57) ABSTRACT

A communication system is described where multiple communication networks are simultaneously accessible from a plurality of fixed and/or mobile communication devices. A Master and Slave hierarchy is implemented among the communication devices to improve communication properties on one or multiple networks. Slave devices are configured to access cellular networks through routing of data with a master device within a sub-network.

17 Claims, 9 Drawing Sheets

(56) References Cited

U.S. PATENT DOCUMENTS

2015/0311969 A1* 10/2015 Desclos ................ H01Q 1/243
455/63.4

* cited by examiner

| | | Network A terminal 1 | Network A terminal 2 | Network A terminal 3 | Network B terminal 1 |
|---|---|---|---|---|---|
| Device 1 | NS mode 1 | 15 | 6 | 2 | 13 |
| Device 1 | NS mode 2 | 7 | 12 | 2 | 13 |
| Device 1 | NS mode 3 | 3 | 4 | 4 | 13 |
| Device 1 | NS mode 4 | 3 | 10 | 3 | 13 |
| Device 2 | NS mode 1 | 4 | 2 | 3 | 15 |
| Device 2 | NS mode 2 | 4 | 3 | 7 | 15 |
| Device 2 | NS mode 3 | 6 | 6 | 5 | 15 |
| Device 2 | NS mode 4 | 5 | 4 | 6 | 15 |
| ... | ... | ... | ... | ... | ... |
| Device N | NS mode 1 | 3 | 10 | 6 | 7 |
| Device N | NS mode 2 | 3 | 5 | 4 | 7 |
| Device N | NS mode 3 | 8 | 3 | 5 | 7 |
| Device N | NS mode 4 | 4 | 6 | 9 | 7 |

FIG.6

|  | Device 1 | | | | Device 2 | | | | ... | Device 9 | | | |
|---|---|---|---|---|---|---|---|---|---|---|---|---|---|
|  | NS mode 1 | NS mode 2 | NS mode 3 | NS mode 4 | NS mode 1 | NS mode 2 | NS mode 3 | NS mode 4 | ... | NS mode 1 | NS mode 2 | NS mode 3 | NS mode 4 |
| Network A terminal 1 | 150 | 50 | 50 | 10 | 20 | 20 | 50 | 50 | ... | 50 | 50 | 50 | 10 |
| Network A terminal 2 | 50 | 100 | 10 | 10 | 10 | 10 | 50 | 10 | ... | 100 | 5 | 5 | 50 |
| Network A terminal 3 | 20 | 20 | 5 | 5 | 10 | 50 | 10 | 50 | ... | 50 | 10 | 50 | 10 |
| Network B terminal 1 | 200 | 200 | 200 | 200 | 200 | 200 | 200 | 200 | ... | 120 | 120 | 120 | 120 |

FIG.7

HETEROGENEOUS NETWORK OPTIMIZATION AND ORGANIZATION UTILIZING MODAL ANTENNA TECHNIQUES AND MASTER-SLAVE SCHEMES

CROSS-REFERENCE TO RELATED APPLICATIONS

This application claims benefit of priority with U.S. Provisional Ser. No. 62/045,509, filed Sep. 3, 2014, titled "HETEROGENEOUS NETWORK OPTIMIZATION AND ORGANIZATION UTILIZING MODAL ANTENNA TECHNIQUES AND MASTER-SLAVE SCHEMES"; and is a continuation in part of U.S. Ser. No. 14/821,655, filed Aug. 7, 2015, titled "HETEROGENOUS NETWORK OPTIMIZATION UTILIZING MODAL ANTENNA TECHNIQUES"; which claims benefit of priority with U.S. Provisional Ser. No. 62/034,554, filed Aug. 7, 2014, having the same title;

the contents of each of which are hereby incorporated by reference.

FIELD OF INVENTION

This invention relates generally to the field of wireless communication. In particular, the present invention relates to operation on multiple communication networks and optimization of network parameters on these networks using Modal antenna techniques.

BACKGROUND OF THE INVENTION

Cellular networks and Wireless Local Area Networks (WLANs) are prevalent in society and have evolved to a level that moderate to high data rate transmissions along with voice communications. Moreover, these networks are becoming increasingly stable and are reliable over large regions and throughout urban areas. Mobile user devices, such as cell phones and tablet PC's, among others, have progressed to the point of providing not only voice communications, low data rate text, and email service, but also, high data rate internet connectivity. Continued adoption of mobile communications systems and introduction of new uses of cellular networks, such as Machine to Machine (M2M) applications, have put strain on the cellular systems in regard to providing consistent service and improved service in terms of higher data rates and less service interruptions from one year to the next. Similar congestion can be found on WLAN networks were large number of users are putting strain on these systems. Continued improvements are sought after to improve communication system reliability, as well as, better command and control of communication nodes and the mobile devices utilizing these nodes.

U.S. Pat. No. 7,911,402, issued Mar. 22, 2011, and titled "ANTENNA AND METHOD FOR STEERING ANTENNA BEAM DIRECTION", hereinafter the '402 patent, describes modal antennas in various embodiments; the contents of the '402 patent are hereby incorporated by reference.

U.S. patent application Ser. No. 14/109,789, filed Dec. 17, 2013, titled "MODAL ADAPTIVE ANTENNA USING PILOT SIGNAL IN CDMA MOBILE COMMUNICATION SYSTEM AND RELATED SIGNAL RECEIVING METHOD", hereinafter the '789 application, describes modal antennas and related signal receiving methods; the contents of the '789 application are hereby incorporated by reference.

U.S. patent application Ser. No. 13/749,627, filed Jan. 24, 2013, and titled "MODAL COGNITIVE DIVERSITY FOR MOBILE COMMUNICATION," hereinafter the '627 application, describes modal antennas and a related modal cognitive diversity scheme in various embodiments; the contents of the '627 patent are hereby incorporated by reference.

SUMMARY OF THE INVENTION

As cellular networks become increasingly congested, off-loading of users onto WLAN becomes an attractive solution. An area of improvement for today's devices and communication networks is better coordination between networks in regard to ensuring that all devices have access to cellular networks. When a group of communication devices are located in-building, and these devices are capable of communication on both cellular networks and WLAN, an improvement over today's system architecture would be to have the capability where an in-building device that has the best connectivity with the cellular network is used to control and coordinate data transfer of the other in-building communication devices on the cellular as well as the in-building WLAN network. Selecting the optimal in-building device to control and coordinate data transfer among the in-building devices will ensure that in-building communication devices that cannot connect to the external cellular network directly due to blockage and propagation challenges can use a data transfer capability from the selected device to pass critical information to the cellular network.

The following invention describes multiple communication systems such as 3G and 4G cellular networks, WLAN systems, and a plurality of fixed and/or mobile communication devices accessing these networks, each combining to make up an aggregate network of devices. In this aggregate cellular and WLAN network, dynamically configurable fixed and/or mobile systems comprising modal adaptive antennas and RF-front end circuits, where network parameters such as capacity and throughput are dynamically managed, operation of these devices can be alternated between networks to optimize communication parameters, wherein a "MASTER" and "SLAVE" designation among groups of fixed and/or mobile communication devices within the aggregate network can be dynamically adjusted to improve communication among the various networks and communication devices.

As described in the commonly owned application Ser. No. 14/821,655 referenced above, modal antenna techniques allow a heterogeneous network to operate more efficiency, leveraging on sub networks, managed by designed "MASTER" devices. These sub-networks communicate with each other from base station to "MASTER" devices; from "MASTER" devices to "MASTER" devices; and from "MASTER" devices to "SLAVE devices, using different protocols and metrics to re-configure themselves.

In the embodiments described herein, the different sub-groups, MASTER's, and SLAVE's can be created from a plurality of fixed and/or mobile communication devices.

BRIEF DESCRIPTION OF THE DRAWINGS

FIG. 6 shows a table containing a signal to interference plus noise ratio (SINR) matrix of data associated with devices connected to the aggregate network, the SINR matrix data can be used as an element of decision for the adjustment of device settings and overall reconfiguration of the individual networks within the aggregate network.

FIG. 7 shows a throughput matrix that can be used as element of decision for the reconfiguration of the network.

DETAILED DESCRIPTION OF THE PREFERRED EMBODIMENTS

Modern devices often support connection on multiple distinct networks at the same time, such as a cellular network and WLAN network. The quality of the link of the different devices with the different access point or terminal of the network is unequal between networks and between devices. The utilization of multi radiation pattern antennas, such as the modal antennas described in the referenced '402 patent, allow the devices to increase the quality of the link with a specific network terminal, base station or access point by changing a radiation mode of the antenna to achieve optimum link quality and/or to reduce interference from nearby interfering signals. This capability can be leveraged to allow heterogeneous networks to be dynamically reconfigured to create sub-groups of devices, supervised by a master device selected among them.

Figure 1:
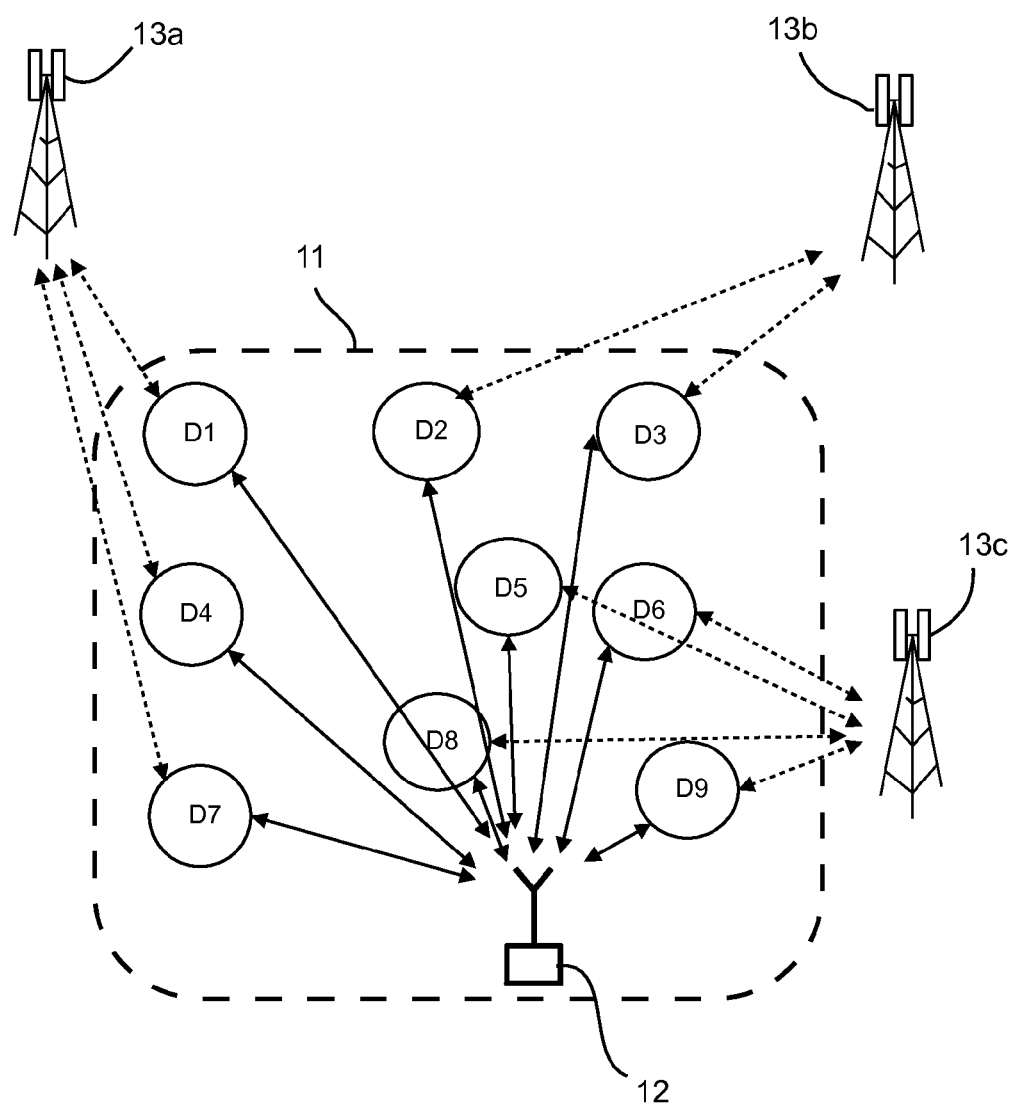
FIG. 1 shows a plurality of fixed and/or mobile devices, each device having a modal antenna system therein, and being located within a footprint associated with a first network, the first network footprint being adjacent to three base stations associated with a second cellular network, with each of the devices is configured to communicate with the first network and at least one base station of the second network, causing a myriad of problems including signal interference, which reduce the link quality of each device and the negatively impact the resulting communication performance.

FIG. 1 shows a plurality of fixed and/or mobile devices, each device having a modal antenna system therein, and being located within a footprint associated with a first network, the first network footprint being adjacent to three base stations associated with a second cellular network, with each of the devices is configured to communicate with the first network and at least one base station of the second network, causing a myriad of problems including signal interference, which reduce the link quality of each device and the negatively impact the resulting communication performance.

In FIG. 1, nine devices D1 to D9 are covered by a first network 11, here a WLAN network, constrained within the coverage area of a second cellular network that is made up of cellular base station towers 13a; 13b; 13c, respectively. The first network comprises an access point 12 serving as a node for communicating with each of the respective devices D1 to D9. Each of the devices is capable of communicating with at least one of the cellular base station towers 13a; 13b; 13c. The devices are each configured to communicate with both the first and second networks. Although this scheme is functional, quality of services decreases as more devices are introduced into the network.

Using modal antenna technologies, such as the active modal antennas described in the referenced '402 patent, an antenna radiation mode of the antenna can be configured from a plurality of available modes. In this regard, an antenna can be actively steered for improving link quality and reducing interferences.

Figure 2:
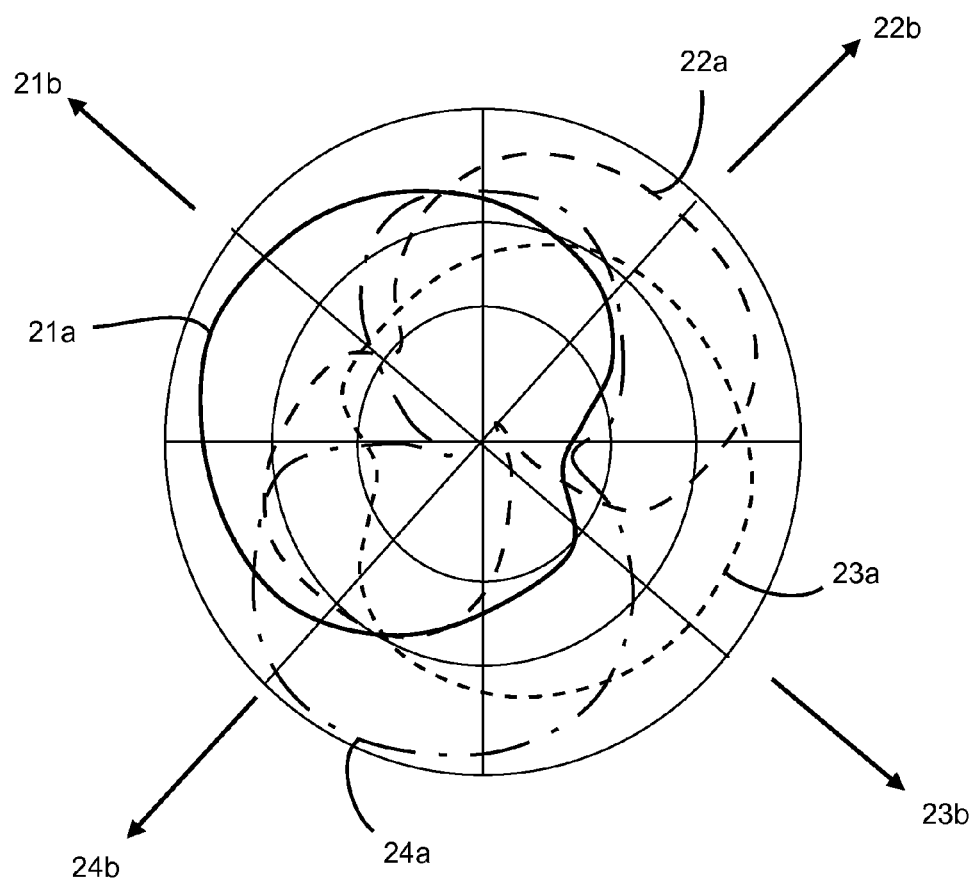
FIG. 2 shows multiple radiation patterns available for selection with a modal antenna system; wherein one or more of the fixed and/or mobile devices of FIG. 1 comprise a modal antenna capable of switching between a plurality of antenna modes and associated radiation patterns.

FIG. 2 shows multiple radiation patterns 21a; 22a; 23a; 24a, and the corresponding signal directions 21b; 22b; 23b; 24b, respectively, available for selection using a modal antenna system such as that described in the referenced '402 patent. Thus, one or more of the fixed and/or mobile devices of FIG. 1 can comprise a modal antenna capable of switching between a plurality of antenna modes and associated radiation patterns.

In an embodiment wherein each of the devices comprises a modal antenna having four modes, each of the devices can therefore sample and store data associated with the quality of its link with the second cellular network for each of the four antenna modes, as well as the quality of its link with the first WLAN network in each mode.

Using the sampled data, each device can deliver the data to a network, for example to the second cellular network shown in the illustrated example, which can further determine which of the devices has the best link quality of the several connected devices, and designate the device with the best link quality as a "MASTER" device. With a "MASTER" device determined, the remaining devices can be designated as "SLAVE" devices, and configured to access the second cellular network for services through a coupling with a "MASTER" device.

Figure 3:
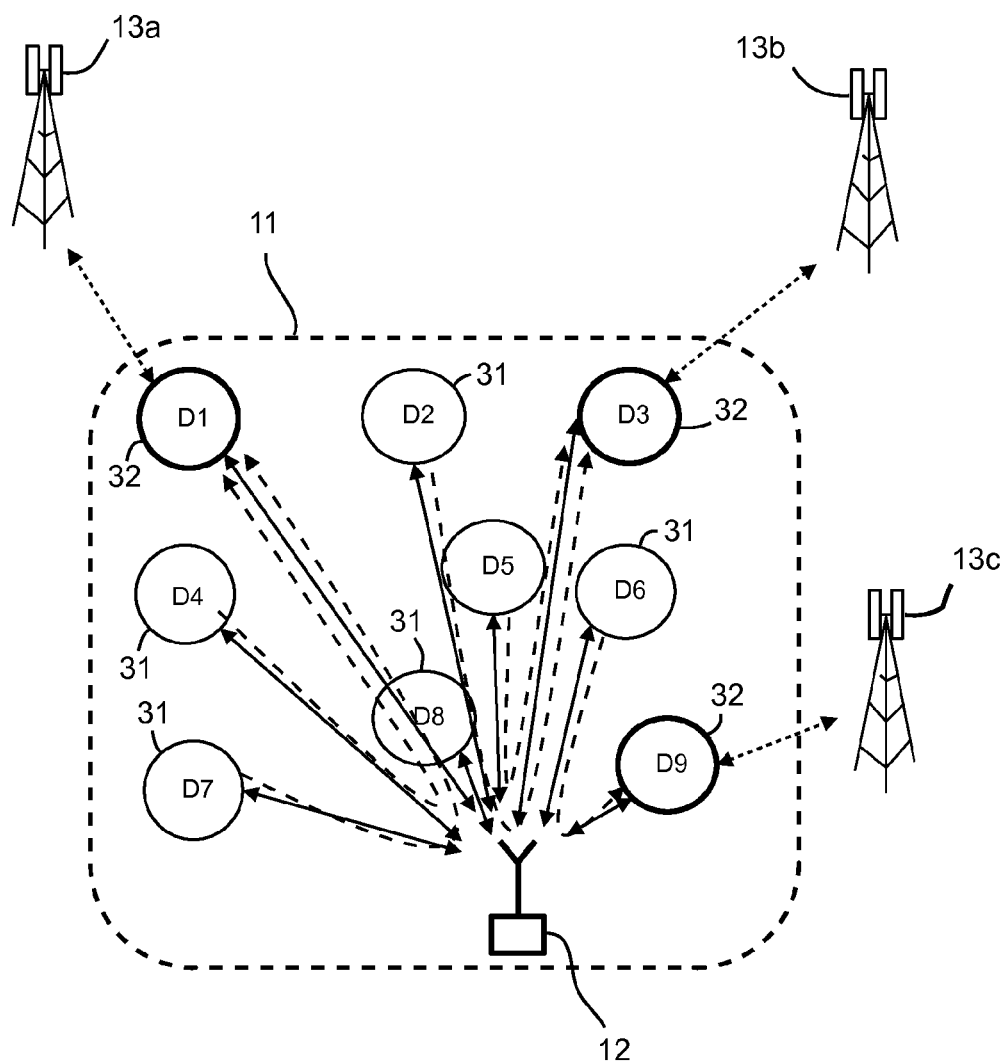
FIG. 3 shows an embodiment wherein three of the fixed and/or mobile devices having the best link quality within the group of devices are configured as "MASTER" devices, and the remaining devices are configured as "SLAVE" devices, each device is configured to communicate with the first network, however, only the master devices are configured to communicate with the second cellular network, wherein the "SLAVE" devices are configured to access data from the second cellular network through a coupling with one of the "MASTER" devices.

FIG. 3 shows an embodiment wherein three of the fixed and/or mobile devices having the best link quality within the group of devices are configured as "MASTER" devices 32, and the remaining devices are configured as "SLAVE" devices 31, each device is configured to communicate with the first network through access point 12, however, only the "MASTER" devices are configured to communicate with the second cellular network 13a; 13b; 13c, wherein the "SLAVE" devices are configured to access data from the second cellular network through a coupling with one of the "MASTER" devices, in this case the "SLAVE" devices coupling to respective "MASTER" devices through the access point 12.

Figure 4:
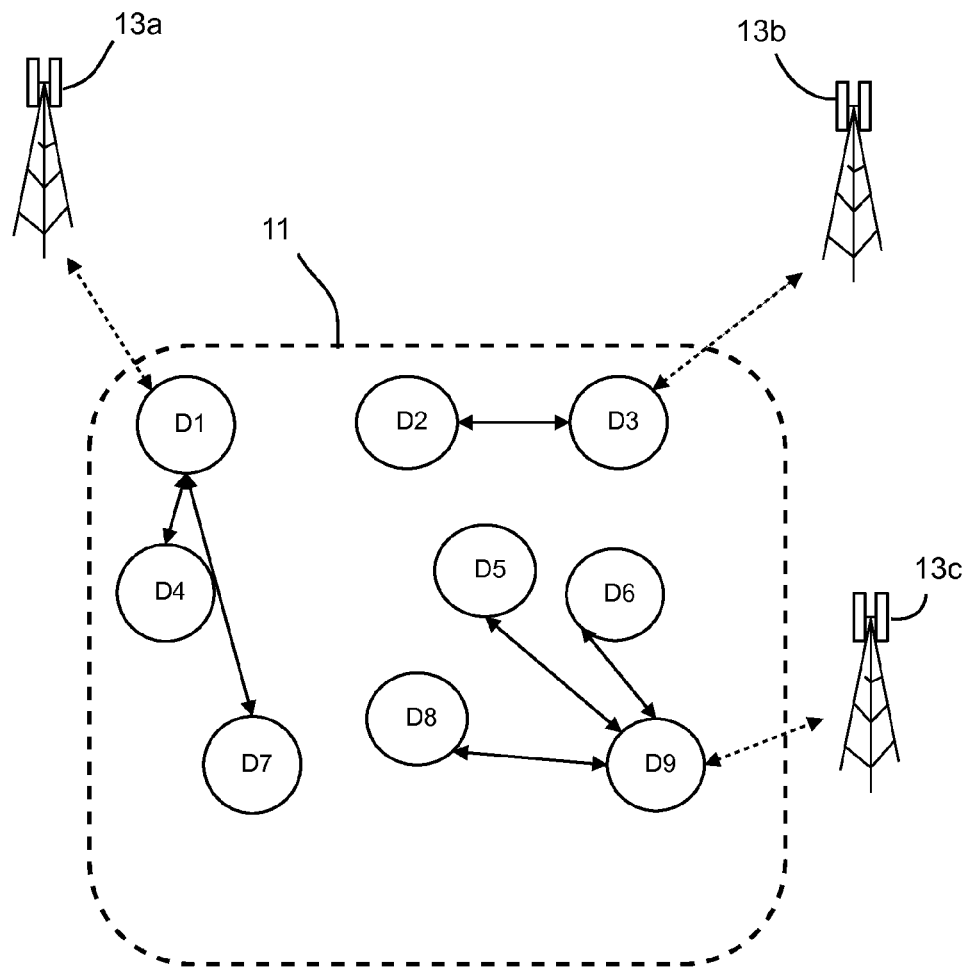
FIG. 4 shows another embodiment, wherein the first network does not include an access point or router, the devices within the footprint of the first network are configured to communicate with each other, and select devices configured as "MASTER" devices are further configured to communicate with the second cellular network, wherein remaining "SLAVE" devices are configured to connect to the second cellular network through a coupled "MASTER" device.

FIG. 4 shows another embodiment, wherein the first network does not include an access point or router, the devices D1 to D9 within the footprint of the first network 11 are configured to communicate with each other, and select devices configured as "MASTER" devices 32 are further configured to communicate with the second cellular network via one of the base station towers 13a; 13b; 13c, respectively, wherein the remaining "SLAVE" devices 31 are configured to connect to the second cellular network through a coupled "MASTER" device 32.

Figure 5:
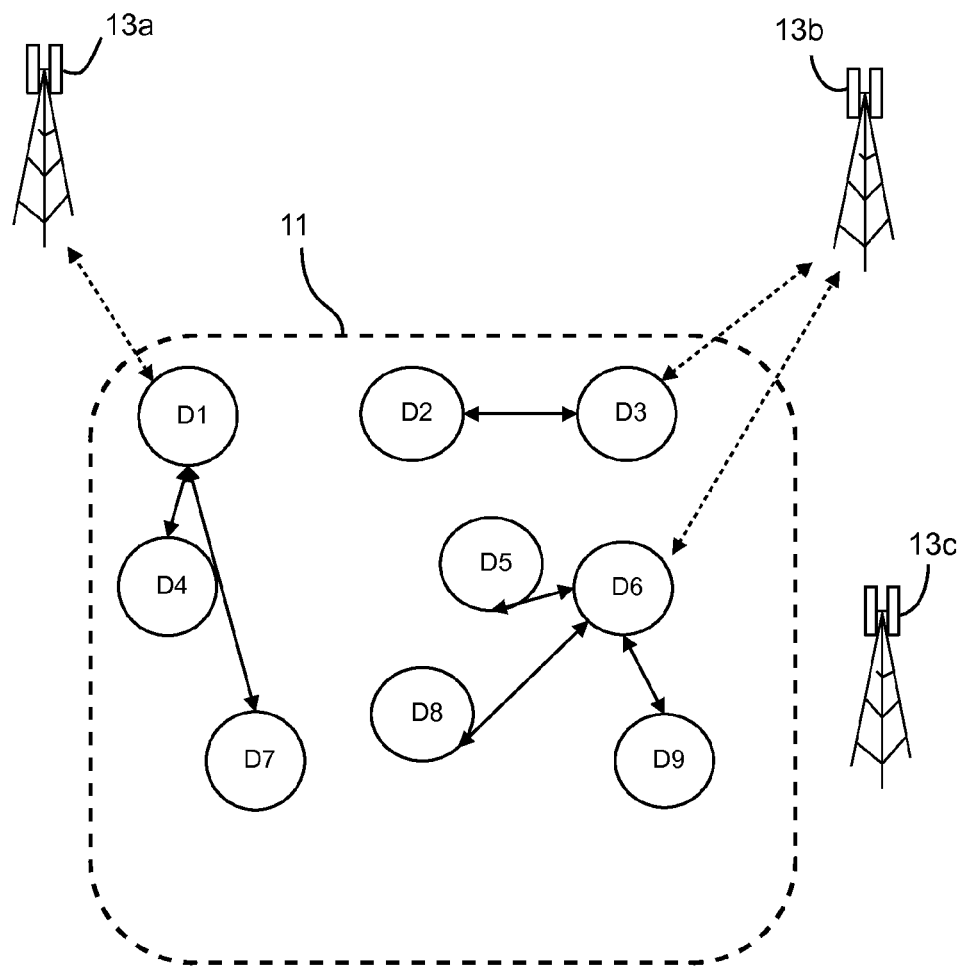
FIG. 5 shows a similar embodiment to that illustrated in FIG. 4, with the variation that each cellular base station tower can designate a plurality of "MASTER" devices for managing the requirements of various other "SLAVE" devices in the network.

FIG. 5 shows a similar embodiment to that illustrated in FIG. 4, with the variation that each cellular base station tower can designate a plurality of "MASTER" devices for managing the requirements of various other "SLAVE" devices 31 in the network. Here, tower 13b is shown communicating with two "MASTER" devices 32.

Several link quality metrics can be used to determine which device of the plurality of devices will be designated as a "MASTER" device, for example, a consolidated matrix made up of data associated with Signal to Interferences plus Noise Ratio (SINR) for each device within the network is presented FIG. 6 and can be used as an element of decision for selecting the "MASTER" device(s) within an individual network.

Another quality metric that can be used is the maximum data throughputs that each device can support on each network, depending of the antenna mode selected, as illustrated in FIG. 7.

Figure 8:
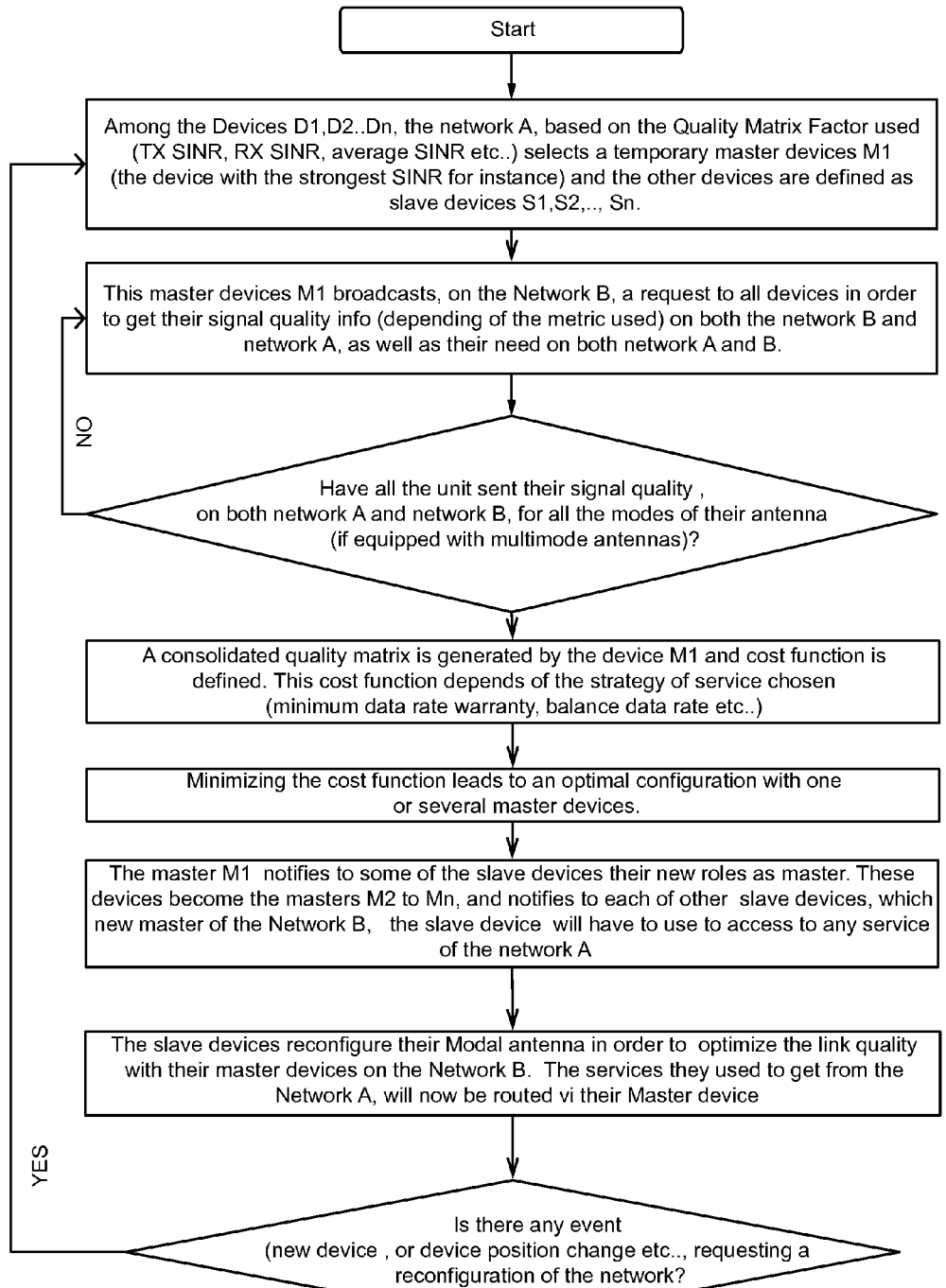
FIG. 8 shows an algorithm to select the "MASTER" devices in the first network that will be used to forward the services of the second cellular network to the "SLAVE" devices in accordance with one embodiment.

FIG. 8 describes a method embodied in a computerized algorithm for selecting each of the "MASTER" devices and "SLAVE" devices in accordance with an embodiment, such as that described in FIG. 3 and the associated description, wherein the first network is a WLAN network having an access point or a base station with which the devices are each configured to connect.

Each device has therefore a Quality Metric Factor $QMF_{i,j,k}$, where "i" is the network number (for instance 0 for the cellular network and 1 for the WLAN network), where "j" is the access point, terminal, or base station of the network, and where "k" is the index of the antenna mode used by the device; note that k=0 if the device has a single mode antenna for this network.

Each network knows the quality that a device has when connected to it, but without necessary knowing the antenna mode selected by the device.

In a first step, the network i=0 (index corresponding for instance to the cellular network) selects from among each of the "N" devices connected to any of the access point of the network, a master device "$M_1$", having the strongest QMF among the "N" devices.

$$M_1 = \text{Max}(QMF_{0,j,n}) n \in (0 \text{ to } N), j \in (0 \text{ to } J)$$

In a second step, this M1 device broadcast on the network i=1 (corresponding to the WLAN network in our example) a request to obtain all of the $QMF_{i,j,k}$ from all the devices connected on the WLAN network, as well as the devices' needs in term of Quality of Services (QoSi) on both networks.

As all the devices on the WLAN network are communicating with each other via an access point, the QMF of the device only depends on the index of the antenna mode selected for a given access point they are connected to.

Thus, in a third step, each device, once it has received the request from the "MASTER", switches over each of it's antenna modes to complete its QMF matrix and then send it to the "MASTER" device M1, the devices QoSi is also sent to the "MASTER".

In the next step, the "MASTER" device M1 which has all the $QMF_{i,j,k,n}$ and all the $QoS_{i,n}$, wherein "n" is the device number, computes a Consolidated Quality of Service (CQoS), which is a metric consolidating all the needs that the devices on the WLAN have from the cellular network.

Among the N×K possible configuration of the network (for instance if there are 9 devices, each of them having a 4 mode antenna on the first network, the result is 36 possible configurations on the first WLAN network), a combination, indexed "z" (z∈(N×K), is selected.

In this "z" configuration, there are "N" factorial possible ways to route the services depending of the number of "MASTER" and "SLAVE" devices selected. For Each of this "N" factorial possibility, using the $QMF_{i,j,k}$ factor, a Quality of Service Achievable ($QoSA_{i,n}$) can be estimated on each network.

A Cost function can therefore be computed for each device "n", wherein:

$$\text{Cost}_{z,i,n} = f(CoS_{i,n} - CoSA_{z,i,n})$$

And for all the devices of a network (first network or second network), a consolidated cost ($CCost_{z,i}$) function can be computed, whereas:

$$CCost_{z,i} = \sum_n Cost_{z,i}$$

Depending on the goal for network prioritization, a Global Consolidated cost function ($GCCost_z$) can be computed to take into account the quality of service on both networks, whereas:

$$GCCost_z = \sum_i Cost_z$$

Finding the minimum $GCCost_z$ among the Z=N×K possible configurations of the network will provide the optimum configuration.

In the final step, once the optimum configuration has been found, the "MASTER" device M1 informs all the other devices of their new role as a "MASTER" (Mx), or "SLAVE" (Sx). In the event they are slaves, they are told which master they should use to access to the services of the cellular network.

If any event occurs on the cellular network, such as a new device on the network, a device leaves the network, change in device position, etc., it may be decided by the cellular network to restart the process of configuration from the beginning.

Figure 9:
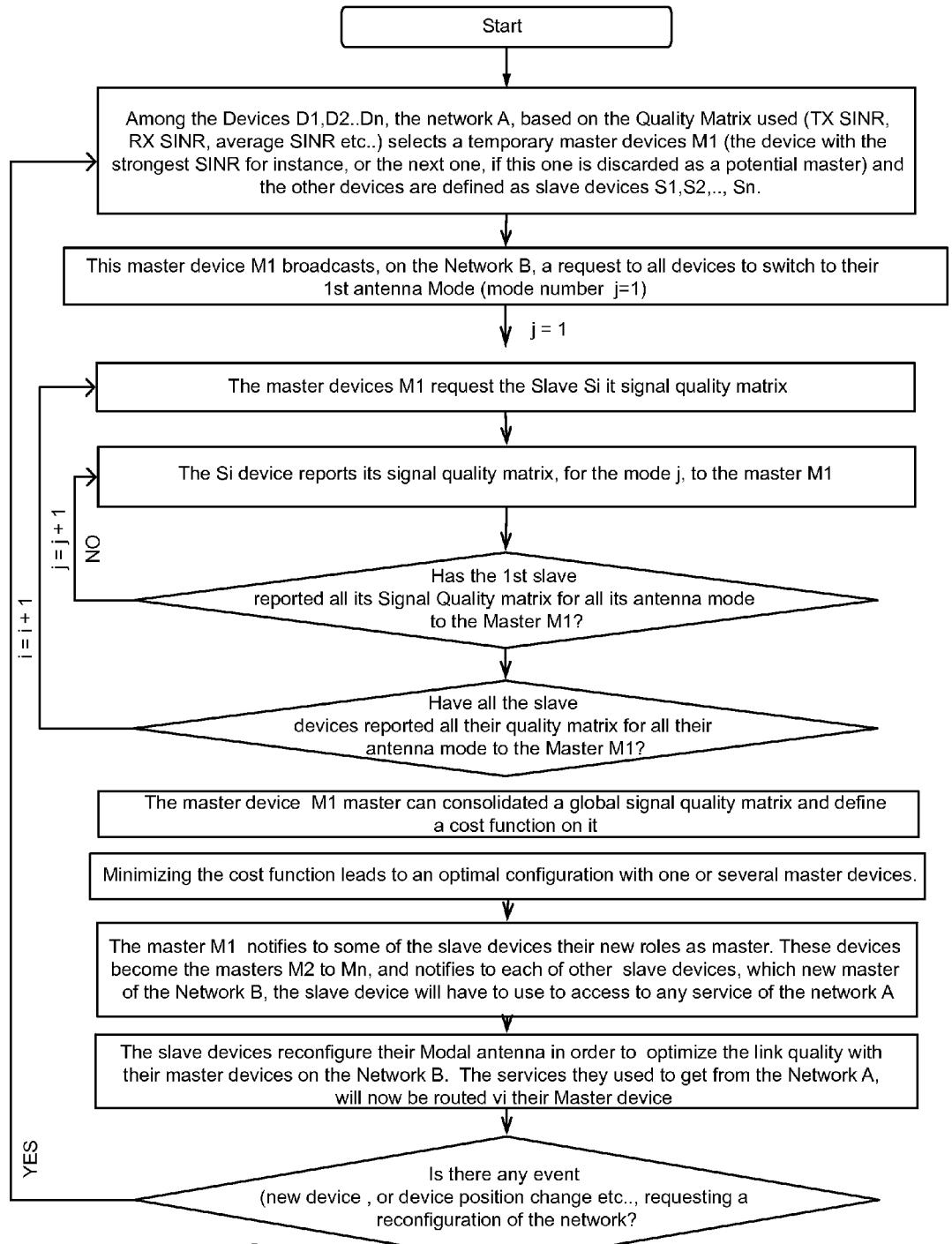
FIG. 9 shows an algorithm to select the "MASTER" devices in the first network that will be used to forward the services of the second cellular network to the "SLAVE" devices in accordance with another embodiment.

In yet another embodiment, as illustrated in FIG. 9, a method embodied in a computerized algorithm for selecting each of the "MASTER" devices and "SLAVE" devices in accordance with an embodiment wherein each of the devices are communicating directly with each other (not an access point), such as that illustrated in FIGS. 4-5. In such a network, as the devices are communicating with each other directly, the number of possible configuration, Z, is more important, wherein:

$$Z = \Pi_n \, k_{i,n},$$

where "ki,n" is the number of antenna modes of the device "n" on the network "i".

Each device of the network has therefore a quality metric factor QMFi,j,z where "i" is the network index, "j" the access point or base station index, and "z" the configuration index for each of the devices.

In a first step, the network i=0 (index corresponding, for instance, to the cellular network) selects among each of the "N" devices connected to any of the access point of the network "i", a "MASTER" device (M1), the "MASTER" device having the strongest QMF at the instant among the N devices, such that:

$$M_1 = \text{Max}(QMF_{0,j,n}) n \in (0 \text{ to } N), j \in (0 \text{ to } J)$$

In a second step, this "MASTER" device (M1), broadcasts a request to all devices to switch back to the antenna mode 0, which will be corresponding to the global configuration z=0, (z∈Z).

The "MASTER" device M1 then broadcasts a request to get the QMFi,j,z from each of the devices connected on the first network, as well as the devices' needs in terms of Quality of Services (QoSi,z) on both networks.

The "MASTER" device (M1) then switches to its next antenna mode, and increases to the global configuration index z=z+1, and requests again all the QMFi,j,z and QoSi,z.

When the "MASTER" device has been through all of its antenna modes, the "MASTER" device goes back to the antenna mode 0 and asks the first "SLAVE" device to switch to its second antenna mode, if the device has this capability, and then the "MASTER" device increases the configuration index z=z+1 and requests again all the QMFi,j,z and QoSi,z.

When this first "SLAVE" has been through all of its antenna modes, the "MASTER" device selects the next "SLAVE" and requests again all the QMFi,j,z and QoSi,z., for all the configuration mode of this "SLAVE".

In the next step, the "MASTER" device (M1), once the master device M1 has gathered all of the QMFi,j,z,n, and QoSi,z.n, "n" being the device number, computes a Consolidated Quality of Service CQoS which is a metric consolidating all the needs that the devices on the first network have from the second cellular network.

For each "z" configuration, there are N factorial possible ways to route the services depending of the number of "MASTER" and "SLAVE" devices selected. For each of this N factorial possibility, using the QMFi,j,z factor, a Quality of Service Achievable QoSAi,n can be estimated on each network.

A Cost function can therefore be computed for each device n, wherein:

$$\text{Cost}_{z,i,n} = f(CoS_{i,n}, CoSA_{z,i,n})$$

And for each of the devices of a network (first or second networks), a consolidated cost (CCostz,i) function can be computed, wherein:

$$CCost_{z,i} = \sum_n Cost_{z,i}$$

Depending of the goal for network prioritization, a Global Consolidated cost function (GCCost$_z$) can be computed to take into account the quality of service on both networks, wherein:

$$GCCost_z = \sum_i Cost_z$$

Finding the minimum GCCost$_z$, among the Z possible configurations of the network will provide the optimum configuration.

In the final step, once the optimum configuration has been found, the "MASTER" device (M1) informs each of the other devices of their new role as "MASTER" (Mx) or "SLAVE" (Sx). In case they are slaves, they are told which master they should use to access to the services of the cellular network.

If any event occurs on the cellular network, it may be decided by the cellular network to restart the process of configuration from the beginning Several policies and strategies can be applied for the optimization of communication networks using the above systems and methods, such as, for example, load balancing, maximum coverage, minimum service warranty, spectral efficiency consideration or power consideration. Depending on the priority for optimization, the main quality factor and metrics that are used in the decision process are generally distinct from one another, but may include: Signal to interference plus Noise Ratio (SINR), receive signal Strength Indicator (RSSI) throughput data rates in Rx, TX, or a combination of both, Channel quality indicator (CQI), or any other channel quality metric. For the Same reason, the different cost functions may be adjusted to give more weight to such or such network, device or access point.

Although specific examples are shown, it should be recognized that cellular, WLAN, or other networks can be interchanged in the given examples. Additionally, the number and position of devices, the number of devices with modal antennas, and other specifics described above are provided for illustrative purpose only and are not intended to be limited to the above examples.

We claim:

1. A communication system, comprising:
    a first wireless network having a network footprint confined within an area of a second wireless network;
    the first network comprising at least one of:
        a wireless local area network (WLAN) having an access point configured to couple with one or more devices, or
        a combination of two or more devices configured to communicate with each other;
        wherein the one or more devices coupled to the access point, or alternatively, the combination of two or more devices configured to communicate with each other, defines a plurality of devices coupled to the first network;
    the second network comprising a cellular communication network having at least one base station terminal positioned in proximity with the first network;
    the communication system further comprising:
        at least one master device selected from the plurality of devices coupled to the first network, said master device being configured to communicate with each of the first network and the second network; and
        a plurality of slave devices consisting essentially of the remaining devices of the plurality of devices coupled to the first network that are not designated as one of the at least on master device, wherein each of said slave device is configured to communicate with the first network, and further configured to communicate with the second network via an associated master device of the at least one master device;

wherein at least one device of the plurality of devices coupled to the first network comprises: a modal antenna, said modal antenna having a plurality of antenna modes, wherein the modal antenna is configured to produce a distinct antenna radiation pattern associated with each of said plurality of modes; and wherein said modal antenna comprises:

an antenna radiating element positioned above a circuit board forming an antenna volume therebetween;

a first parasitic conductor positioned adjacent to the radiating element and within the antenna volume, the first parasitic conductor element being coupled to a first active tuning component for adjusting a reactance of the first parasitic conductor to adjust a frequency response of the antenna; and a second parasitic conductor element positioned adjacent to the radiating element and outside of the antenna volume, the second parasitic conductor element being coupled to a second active tuning component for adjusting a reactance of the second parasitic conductor to steer the antenna radiation pattern associated with the antenna.

2. The communication system of claim 1, wherein said first network comprises a wireless local area network (WLAN) having an access point configured to couple with one or more devices.

3. The communication system of claim 1, wherein said first network comprises a combination of two or more devices configured to communicate with each other.

4. The communication system of claim 1, wherein said first network comprises each of: a wireless local area network (WLAN) having an access point configured to couple with one or more devices, or a combination of two or more devices configured to communicate with each other; wherein the one or more devices coupled to the access point, or alternatively, the combination of two or more devices configured to communicate with each other, defines a plurality of devices coupled to the first network.

5. The communication system of claim 1, wherein each device of the plurality of devices coupled to the first network comprises: a modal antenna, said modal antenna having a plurality of antenna modes, wherein the modal antenna is configured to produce a distinct antenna radiation pattern associated with each of said plurality of modes.

6. The communication system of claim 1, comprising a network controller having an algorithm residing therein, said network controller configured to:

request a quality metric factor (QMF) and a quality of service (QOS) requirement from each device of the plurality of devices;

receive a QMF and QOS from each device;

determine which device of the plurality of devices has the best QMF and designating the device having the best QMF as one of the at least one master device; and designating one or more of the remaining devices of the plurality of devices as slaves.

7. A method for selecting each of a master device and one or more slave devices within an aggregate network, said aggregate network comprising a first non-cellular network and a second cellular network, wherein it is desirable to reduce the number of devices connected to the cellular network, the method comprising:

among a plurality of devices coupled to the cellular network, one or more of said plurality of devices comprising a modal antenna having a plurality of antenna modes, wherein the modal antenna is configured to produce a distinct antenna radiation pattern associated with each of said plurality of antenna modes, and in a first iteration, selecting a temporary master device, and designating one or more remaining devices of the plurality of devices as slave devices;

with the temporary master device, broadcasting over the non-cellular network a request to all devices coupled to the non-cellular network for a quality metric factor (QMF) and a quality of service (QOS) requirement for each of the cellular and non-cellular networks;

if all devices coupled to the non-cellular network deliver the requested QMF and QOS data, then generating a consolidated matrix using the QMF and QOS data of each device, and defining a cost function based on a strategy of service chosen;

otherwise, repeating a broadcast over the non-cellular network a request to all devices coupled to the non-cellular network for a QMF and a QOS requirement for each of the cellular and non-cellular networks;

determining a minimized cost function and an associated configuration with one or more of the devices chosen for configuration as master devices;

with the temporary master device, communicating to one or more of the slave devices instructions to reconfigure as a master device, such that in a second iteration the aggregate network comprises at least one master device;

for each master device of the second iteration, notifying one or more devices to configure as a slave device associated therewith;

with each slave device, configuring an antenna mode for optimizing communication link quality with the associated master device; and upon a network event, requesting a reconfiguration of the aggregate network;

wherein each of the master devices is configured to communicate with each of the first non-cellular network and the second cellular network; and wherein each of the slave devices is configured to communicate with the first non-cellular network, but said slave devices must access services of the second cellular network through a routing with the associated master device.

8. The method of claim 7, wherein said QMF comprises at least one of: signal to interference plus Noise Ratio (SINR); receive signal strength indicator (RSSI); throughput data rates in Rx, Tx, or a combination thereof; or Channel quality indicator (CQI).

9. The method of claim 7, wherein said cost function is optimized for minimum data rate warranty.

10. The method of claim 7, wherein said cost function is optimized for balance data rate.

11. The method of claim 7, wherein said network event comprises one of: introduction of a new device in the aggregate network, or a change in position of one or more of said plurality of devices.

12. A method for selecting each of a master device and one or more slave devices within an aggregate network, said aggregate network comprising a first non-cellular network and a second cellular network, wherein it is desirable to reduce the number of devices connected to the cellular network, the method comprising:

among a plurality of devices coupled to the cellular network, one or more of said plurality of devices comprising a modal antenna having a plurality of antenna modes, wherein the modal antenna is configured to produce a distinct antenna radiation pattern associated with each of said plurality of antenna modes, and in a first iteration, selecting a temporary master device, and designating one or more remaining devices of the plurality of devices as slave devices;

with the temporary master device, broadcasting over the non-cellular network a request to all devices coupled to the non-cellular network for configuration of the modal antenna in a first mode of the plurality of modes thereof, and with each respective device in the first mode, obtaining a quality metric factor (QMF) and a quality of service (QOS) requirement for each of the cellular and non-cellular networks with the antenna in the first mode, the QMF and QOS data forming a quality matrix of the device in the first mode, then repeating with all devices for each subsequent mode of the plurality of antenna modes thereof for procuring a quality matrix for each device containing data associated with the device in each of the plurality of modes;

if all devices coupled to the non-cellular network deliver the requested quality matrix for each mode, then generating a consolidated global signal quality matrix, and defining a cost function based on a strategy of service chosen; otherwise, repeating a broadcast over the non-cellular network a request to all devices coupled to the non-cellular network for a quality matrix of each mode of the plurality of modes;

determining a minimized cost function and an associated configuration with one or more of the devices chosen for configuration as master devices;

with the temporary master device, communicating to one or more of the slave devices instructions to reconfigure as a master device, such that in a second iteration the aggregate network comprises at least one master device;

for each master device of the second iteration, notifying one or more devices to configure as a slave device associated therewith;

with each slave device, configuring an antenna mode for optimizing communication link quality with the associated master device; and upon a network event, requesting a reconfiguration of the aggregate network;

wherein each of the master devices is configured to communicate with each of the first non-cellular network and the second cellular network; and wherein each of the slave devices is configured to communicate with the first non-cellular network, but said slave devices must access services of the second cellular network through a routing with the associated master device.

13. The method of claim 12, said first non-cellular network comprising: a combination of two or more devices configured to communicate with each other.

14. The method of claim 12, wherein said QMF comprises at least one of: signal to interference plus Noise Ratio (SINR); receive signal strength indicator (RSSI); throughput data rates in Rx, Tx, or a combination thereof; or Channel quality indicator (CQI).

15. The method of claim 12, wherein said cost function is optimized for minimum data rate warranty.

16. The method of claim 12, wherein said cost function is optimized for balance data rate.

17. The method of claim 12, wherein said network event comprises one of: introduction of a new device in the aggregate network, or a change in position of one or more of said plurality of devices.

* * * * *